(12) United States Patent
Tan et al.

(10) Patent No.: US 8,688,893 B2
(45) Date of Patent: Apr. 1, 2014

(54) MEMORY DEVICE AND MEMORY INTERFACE

(75) Inventors: Khiam Yong Thomas Tan, Singapore (SG); Osman Bin Abu Bakar, Singapore (SG)

(73) Assignee: Intel Mobile Communications GmbH, Neubiberg (DE)

( * ) Notice: Subject to any disclaimer, the term of this patent is extended or adjusted under 35 U.S.C. 154(b) by 1141 days.

(21) Appl. No.: 12/490,052

(22) Filed: Jun. 23, 2009

(65) Prior Publication Data

US 2010/0325341 A1    Dec. 23, 2010

(51) Int. Cl.
*G06F 12/00*   (2006.01)
*G06F 13/00*   (2006.01)

(52) U.S. Cl.
USPC ............................ 711/103; 711/100; 711/154

(58) Field of Classification Search
USPC ......................................... 711/103, 100, 154
See application file for complete search history.

(56) References Cited

U.S. PATENT DOCUMENTS

| | | | |
|---|---|---|---|
| 5,293,562 A * | 3/1994 | Pope | 365/189.02 |
| 5,467,318 A * | 11/1995 | Motomura | 365/230.06 |
| 5,644,539 A * | 7/1997 | Yamagami et al. | 365/200 |
| 6,138,215 A | 10/2000 | Check et al. | |
| 6,226,733 B1 * | 5/2001 | Belgard | 711/213 |
| 7,124,252 B1 | 10/2006 | Khare et al. | |
| 7,360,058 B2 | 4/2008 | Flood et al. | |
| 7,363,233 B1 * | 4/2008 | Levine | 705/1.1 |
| 7,586,794 B2 * | 9/2009 | Lee | 365/189.07 |
| 2002/0032829 A1 * | 3/2002 | Dalrymple | 711/5 |
| 2007/0214324 A1 | 9/2007 | Tsai et al. | |
| 2008/0144381 A1 * | 6/2008 | Kang et al. | 365/185.12 |
| 2008/0183982 A1 * | 7/2008 | Sugahara et al. | 711/154 |
| 2009/0113118 A1 * | 4/2009 | Lee et al. | 711/103 |
| 2009/0138651 A1 * | 5/2009 | Chen | 711/103 |
| 2010/0023812 A1 * | 1/2010 | Moyer | 714/47 |

FOREIGN PATENT DOCUMENTS

| | | | |
|---|---|---|---|
| KR | 1020070069346 A | 7/2007 | |
| WO | 0217086 A2 | 2/2002 | |
| WO | 2008035352 A2 | 3/2008 | |

\* cited by examiner

*Primary Examiner* — Tuan Thai

(74) *Attorney, Agent, or Firm* — Eshweiler & Associates, LLC

(57) ABSTRACT

Memory devices and memory interfaces are disclosed. In an implementation a memory controller of a memory device is configured to receive a first part of an address for memory access, and to perform a memory access based on said first part and a part of a previously received address.

25 Claims, 3 Drawing Sheets

MEMORY DEVICE AND MEMORY INTERFACE

FIELD OF THE INVENTION

The present invention relates to memory devices, memory interfaces for interfacing with memory devices, apparatuses comprising a memory device and/or a memory interface and corresponding methods.

Many modern electronic devices comprise one or more memory devices for storing data. For example, systems like mobile phones, GPS systems (Global Positioning System) or other mobile devices or embedded systems often use a flash memory for storing data and code. Flash memories are memories which are rewritable, but retain stored data when power is switched off.

Among flash memories, serial flash memories or parallel flash memories are specific types of flash memories. Serial flash memories generally comprise fewer pins for transmitting information to and from the memory device, for example for pins like an enabling pin, a clock pin, a data input pin and a data output pin. As fewer pins are provided in a serial flash memory device, serial flash memory devices are sometimes preferred for mobile electronic devices where space constrains are important. On the other hand, if for example a single pin is provided for data input and a single pin is provided for data output, all transmission like command transmission, address transmission or data transmission occurs serially, i.e. one bit after the other, which tends to be slower than a parallel data transmission.

SUMMARY

According to an embodiment, a memory device is provided, comprising:
a memory controller, said memory controller comprising an input to receive an address for a memory access, and
a memory coupled to said memory controller,
said memory controller being adapted to:
receive a first part of an address, and
perform a memory access based on said first port and a port of a previously received address.

Other embodiments relate to memory interfaces, electronic apparatuses comprising a memory device or a memory interface and corresponding methods.

It is to be noted that the above summary is intended to provide a brief overview of some aspects of the present invention and is not to be construed as limiting. In particular, the above mentioned features of a memory device are not construed to be essential for the invention.

DETAILED DESCRIPTION OF THE INVENTION

Figure 1:
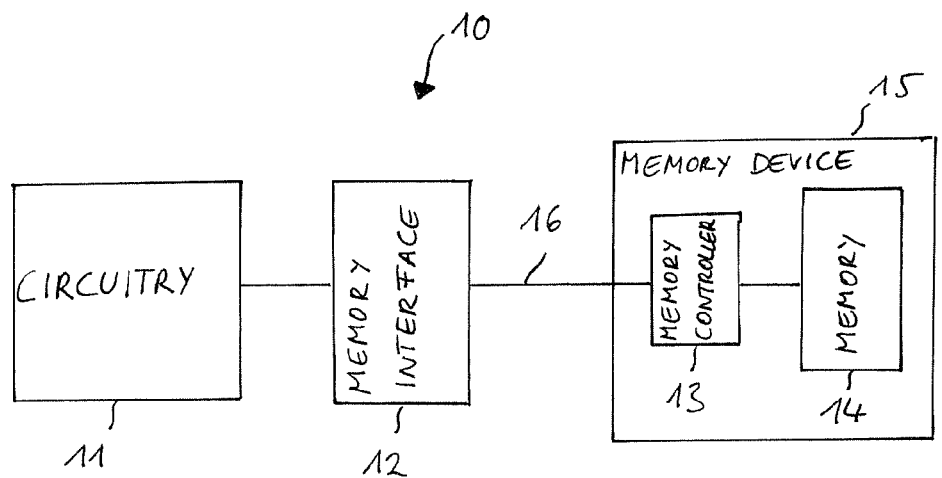
FIG. 1 shows a block diagram of an electronic apparatus according to an embodiment of the present invention.

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings, but is intended to be limited only by the appended claims and equivalents thereof.

It is to be understood that in the following description of embodiments any direct connection or coupling between functional blocks, devices, components, circuit elements or other physical or functional units shown in the drawings or described herein, i.e. any connection without intervening elements, could also be implemented by an indirect connection or coupling, i.e. a connection or coupling with one or more intervening elements. Furthermore, it should be appreciated that functional blocks or units shown in the drawings may be implemented as separate circuits in some embodiments, but may also be fully or partially implemented in a common circuit, for example an integrated circuit, in other embodiments. It is further to be understood that any connection which is described as being wire-based in this following specification may also be implemented as a wireless communication connection unless noted to be contrary.

It should be noted that the drawings are provided to give an illustration of some aspects of some embodiments of the present invention and are therefore regarded to be schematic only. In particular, elements shown in the drawings are not necessarily to scale with each other, and the placement of various elements in the drawings is chosen to provide a clear understanding of the respective embodiment and is not to be construed as necessarily reflecting the actual relative locations of the various components shown. Therefore, any directional terminology like "top","bottom","left" or "right" is used only for easy reference to the drawings and is not to be construed as limiting the actual positions.

The features of various embodiments described in the following may be combined with each other unless specifically noted otherwise. On the other hand, describing an embodiment as comprising a plurality of features is not to be construed as indicating that all these features are necessary for practicing the present invention or that all these features may only be used in combination with each other. Instead, in other embodiments, some features may be left out or replaced by alternative features, and in other embodiments additional features may be added.

Turning now to FIG. 1, an electronic apparatus 10 according to an embodiment of the present invention is shown. Electronic apparatus 10 may basically be any kind of electronic apparatus, for example a computer or a mobile electronic device like a cellular phone, a portable gaming device, a GPS receiver (Global Positioning System) or personal digital systems.

Electronic device 10 comprises a memory device 15 according to an embodiment of the present invention. Memory device 15 may but need not, be a flash memory device. However, in other embodiments memory device 15 may be or comprise a different type of memory device, for example a random access memory (RAM) or a phase change memory. Memory device 15 in an embodiment may but need not, be a memory device incorporated in electronic apparatus 10, but in other embodiments may also be a removable memory device, for example a memory device of a removable memory card.

Electronic apparatus 10 furthermore comprises circuitry 11 and a memory interface 12 according to an embodiment of the present invention via which circuitry 11 may access memory device 15, for example write data to memory device 15 or read data from memory device 15. Memory interface 12 may comprise a bus system for coupling with circuitry 11. Circuitry 11 may be any kind of circuitry incorporated in the particular electronic apparatus 10 and may for example comprise one or more processors, logic elements, resistors, capacitors, integrated circuits or any other type of electronic components. For example, in case electronic apparatus 10 is a cellular phone, circuitry 11 may comprise communication circuitry.

Memory interface 12 is coupled with memory device 15 via a connection 16 in the embodiment of FIG. 1. In an embodiment, connection 16 may be a serial connection. For example, connection 16 may comprise a single line for transmitting data from memory interface 12 to memory device 15 and a further line for receiving data from memory device 15 at memory interface 12. In addition, connection 16 may comprise further lines for example a line for transmitting a clock signal or a line for transmitting an enabling signal. However, other connections like parallel connections are also possible.

Memory device 15 in the embodiment shown comprises a memory controller 13 and memory 14 which may be arranged in one or more memory banks.

In order to access memory device 15 upon a request from circuitry 11, for example for reading data from memory device 15, memory interface 12 transmits a corresponding access command together with access information via connection 16 to memory device 15. Such access information generally comprises a memory address at which the access is to be performed, for example a memory address from which data is to be read. In an embodiment, the connection 16 is such that the address is sent sequentially to memory controller 13 of memory device 15. For example, when connection 16 is a serial connection as explained above, bits of the address are sent one after the other. For example, sending a 24-bit-address then may require 24 clock cycles during each of which one bit is sent. However, the number of 24 bits is to be taken only as an example. Also, a similar situation may occur with parallel connections 16 the width of which is smaller than the address length. For example, if connection 16 is a 4-bit parallel connection and the address length again is 24 bits, 6 clock cycles during each of which 4 address bits are transmitted are needed for transmitting the complete address.

In some embodiments, memory controller 13 starts the memory access after having only received a part of the complete address via connection 13. In an embodiment, the remaining (not yet) received part of the address is estimated based on a previous address of a previous memory access. Therefore, in such an embodiment the memory access is performed with an estimated address which may, but need not be correct. This kind of access will be also referred to as "opportunity access" in the following. In such embodiments, time can be saved in case the estimated address used for the opportunity access (in the following also referred to as opportunity access address or OA address) corresponds to the actual desired address. After having received the complete address, in an embodiment memory controller 13 may then check whether the OA address was the correct one and if not, repeat the memory access with the complete address then received.

In an embodiment, memory interface 12 or a control unit thereof accommodates the different access times needed when the opportunity access (OA) is successful and when it is not successful and the complete received address has to be used by inserting different numbers of so-called "dummy clock cycles", i.e. different numbers of clock cycles where essentially nothing related to the memory access happens for example on the above-mentioned bus system apart from waiting for the completion of the address transmission.

The above concepts will be illustrated further in the following with reference to FIGS. 2 and 3.

Figure 2:
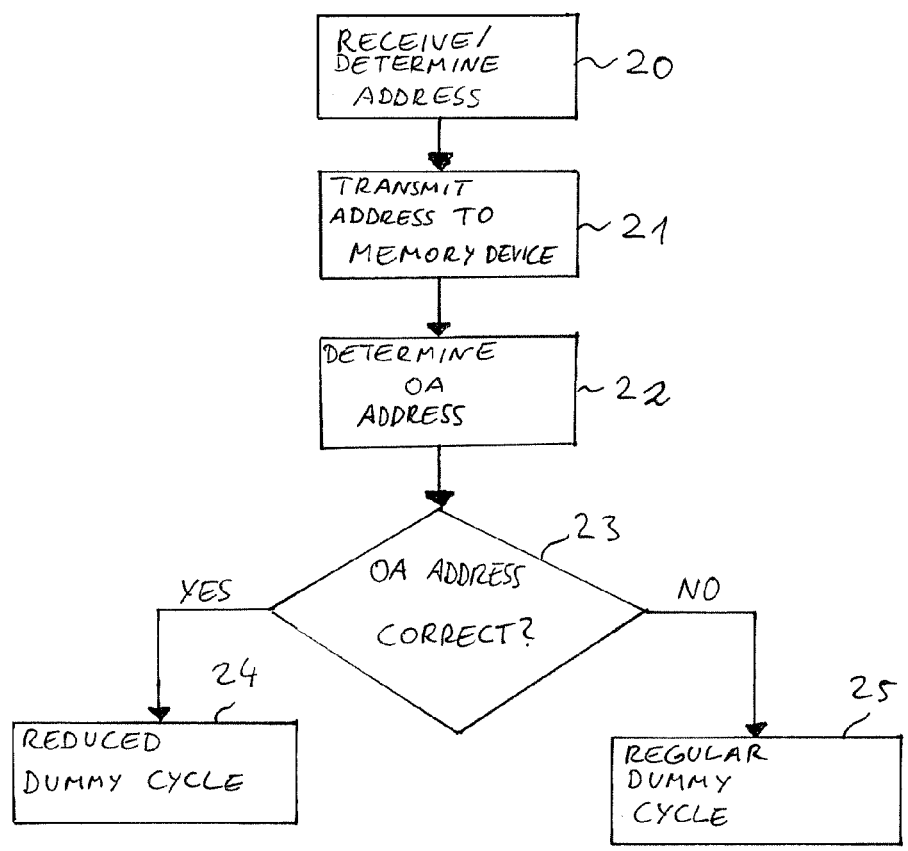
FIG. 2 shows a flow diagram of a method according to an embodiment of the present invention.
Figure 3:
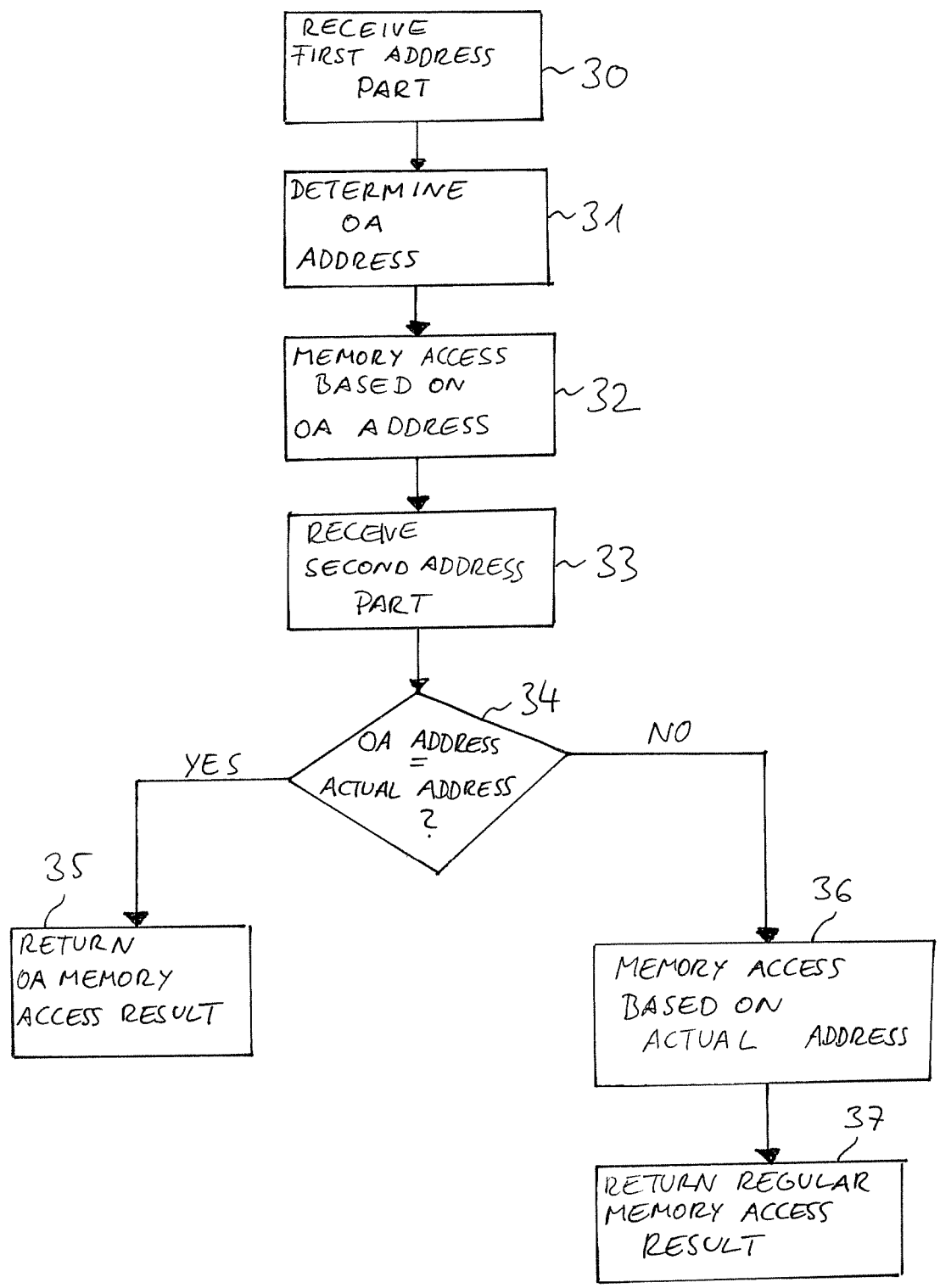
FIG. 3 shows a flow diagram of a method according to a further embodiment of the present invention.

FIG. 2 shows an embodiment of a method which may for example be implemented in memory interface 12, and FIG. 3 shows a flow diagram of an embodiment of a method which for example may be implemented in memory controller 13. However, it should be noted that the embodiments discussed now with reference to FIGS. 2 and 3 may be implemented independent from the embodiment of FIG. 1 and also independent from each other.

Turning now to FIG. 2, at 20 for example in memory interface 12 or in another part of a circuit which intends to access a memory an address for the memory access is received or determined. Determining the address may for example involve converting a received logical address to a physical address of the memory device, although such a conversion in other embodiments may also be performed in the memory device itself.

At 21, the address received or determined at 20 is transmitted to a memory device like for example memory device 15 of FIG. 1, possibly together with command data (for example a read command).

At 22, the above-mentioned opportunity access address is determined based on a part of the address transmitted at 21 and a part of a previously used address, for example a previous address used immediately preceding the address determined at 20. Examples for such opportunity access addresses will be discussed later.

At 23 it is determined if the opportunity access address is correct, i.e. if it matches the address received or determined at 20. If the OA address is correct, this means that the actual memory access in the memory device is performed faster than with an access based on the complete received address at the memory device. In this case, at 24 a reduced number of dummy cycles is inserted. The reduced number of dummy cycles may be a positive number less than a regular number of dummy cycles which is necessary in case the memory access is based on the complete received address, or may be even zero.

If the OA address is not correct, this means that the memory access will be performed based on the complete address upon receipt in the memory device, and the regular number of dummy cycles is inserted at 25. The dummy cycles as explained above may for example be dummy cycles on a bus system.

It should be noted that the diagram of FIG. 2 is not to be construed as indicating that the various action described with reference thereto necessarily have to performed in the detected order. For example, in FIG. 2, the determining of the OA address at 22 and the actions described with reference to 23, 24 and 25 may be performed before the transmission of the address at 21 or also parallel to the transmission of the address, i.e. the various actions at 22-25 may be performed while the address is transmitted to the memory device.

Turning now to FIG. 3, a method of an embodiment which may be implemented in a memory controller like memory controller 13 of a memory device, for example a flash memory device, will be described.

At 30, a first part of an address is received. At 31, an opportunity access address (OA address) is determined based on the first address part received at 30 and a part of previous address received during a previous memory access, for example received for an immediately preceding memory access.

At 32, a memory access based on the OA address is initiated, for example data is read from a memory associated with the memory controller at the OA address.

At 33, a second address part is received, the first address part received at 30 and the second address part received at 33 in this embodiment forming the complete actual address. At 34, it is checked if the OA address matches this actual address. If this is the case, the memory access at 32 was made using the correct address, and at 35 the OA memory access results obtained by the memory access at 32 are returned, for example to a circuitry from which the address (usually together with some additional command) was received.

If, on the other hand, the OA address does not match the actual address, at 36 a memory access based on the actual address is initiated, i.e. a regular access based on the complete received address. At 37, the result of this regular memory access is then returned.

Similar to what has been explained for the embodiment of FIG. 2, the arrangement of the various actions in FIG. 3 serve merely as examples, and in other embodiments other orders are possible. For example, the receiving of the second address part at 33 in an embodiment may be performed in parallel to the OA memory access at 32, i.e. while the memory controller where the method is implemented accesses the memory at the same time the memory controller continues to receive the address.

In the following, examples for forming opportunity access addresses will be explained with reference to FIGS. 4 and 5. In these examples, it is assumed that the memory addresses comprise 24 bits each and have to be transmitted via a serial bus, i.e. one bit after the other. However, the number of 24 bits serves only as an example and depending on the type of memory other address lengths may be used as well.

In these examples it is assumed that A23 is the most significant bit, i.e. the bit with the highest value (e.g. $2^{23}$), while A00 is the least significant bit, i.e. the bit with the lowest value (e.g. $2^0$). Moreover, it is assumed in the example of FIG. 4 that in consecutive memory accesses there is a high probability that one or more of the most significant bits remain constant over a plurality of addresses, i.e. that the address usually does not change much from access to access.

Figure 4:
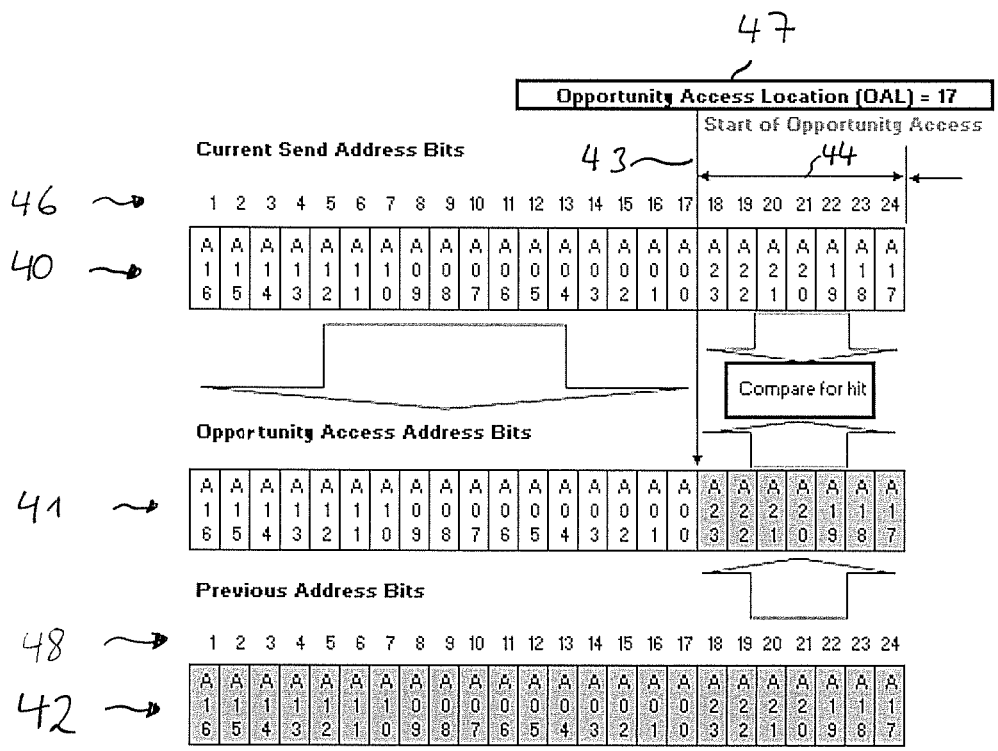
FIGS. 4 and 5 show examples of addresses of some embodiments of the present invention.

In the embodiment of FIG. 4, for example 16 megabyte of memory may be addressed, and the memory may be grouped in 128 kilobyte-groups, where the group is given by the 7 most significant bits which for example tend to change not often.

In FIG. 4, in an upper row generally denoted with 40 address bits A23 to A00 of an address currently sent from a memory interface like memory interface 12 of FIG. 1 to a memory device, for example memory controller 13 of memory device 15 of FIG. 1, are shown. The order in which the address bits are sent is given by a row generally labeled 46 in FIG. 4. As can be seen, in this embodiment the address bits are not sent in their consecutive order, i.e. the order according to their values, but at first address bits A16 to A00 are sent, and then address bits A23-A17 are sent. In other words, the seven most significant bits A23-A17 are sent at the end of the address transmission. In this embodiment, as indicated by 47 an opportunity access location (OAL) is set to 17, i.e. after 17 (of the 24) received address bits the opportunity access explained above is started, for example the memory access at 32 in the embodiment of FIG. 3. Reference numeral 47 may for example symbolize a register within a memory controller where the OAL is stored. For example, in the register a number of address bits received, i.e. a size of an address part received, before the opportunity access starts, may be stored. In other words, after having received the address bits A16-A00, an opportunity access address is formed which is shown in a middle row of FIG. 4 and generally labeled 41 by combining these 17 bits of the current sent address 40 with the 7 most significant bits A23-A17 of a previously received address which is shown in the lower row of FIG. 4 and generally labeled 42. Previous address 42 may for example be an address used for a memory access immediately preceding the memory access for which the current sent address 40 is intended. The bits of the previous address as indicated by a row 48 in FIG. 4 of the embodiment currently discussed were sent in the same order as the bits of the currently sent address 40, although in other embodiments this need not be the case. The start of the opportunity access in FIG. 4 is also marked with an arrow 43. In the embodiment of FIG. 4, when checking if the opportunity access address 41 corresponds to the actual address, i.e. currently sent address 40, only the bits A23-A17 need to be compared as indicated in FIG. 4 since the remaining opportunity access address is formed on the basis of the currently sent address 40. As a matter of course, in some embodiments nevertheless the complete addresses may be compared.

In case the opportunity access address is correct, i.e. in case opportunity access address 41 matches actual address 40, as indicated by an arrow 44 7 clock cycles corresponding to the transmission of the 7 address bits A23-A17 are saved, and the number of dummy cycles mentioned previously may be reduced accordingly.

It should be noted that the choice of the opportunity access location (after 17 received bits in the embodiment of FIG. 4) serves only as an example, and other values may be used as well. The choice of the opportunity access location and the order the address bits are sent may be adapted to each other, such that until the opportunity access in an embodiment the lower bits are sent, while after that the higher bits are sent. For example, if the opportunity access location would be set to 15 in the embodiment of FIG. 4, first address bits are A14-A00 could be sent followed by address bits A23-A15. In an embodiment, the choice of the opportunity access location may be user configurable. Generally, a lower opportunity access location, i.e. an earlier start of opportunity access, saves more time in case the opportunity access address matches the actual intented address, but tends to reduce the probability of such a match somewhat.

It should furthermore be noted that the general order explained with reference to FIG. 4, i.e. sending lower bits prior to sending higher bits, is suitable in particular for situations where the probability that the lower bits change from address to address is higher than the probability that the higher bits change, for example if adjacent addresses accessed consecutively. In other situations, for example situations where the higher bits tend to change more often, a different order may be used, for example the higher bits may be sent first.

Also, more complexe orders of sending the bits may be used, for example depending on the actual significance of the various bits. For example, in some embodiments the memory may be organized in so-called memory banks, and some bits may indicate the memory bank to be used. Depending on whether the memory bank tends to change often or less often from address to address, the bits concerning the memory bank may be sent first or last. In general, the ordering of bits and the location of the opportunity access as already mentioned may be chosen depending on which bits tend to change more often, which then may be sent first.

Figure 5:
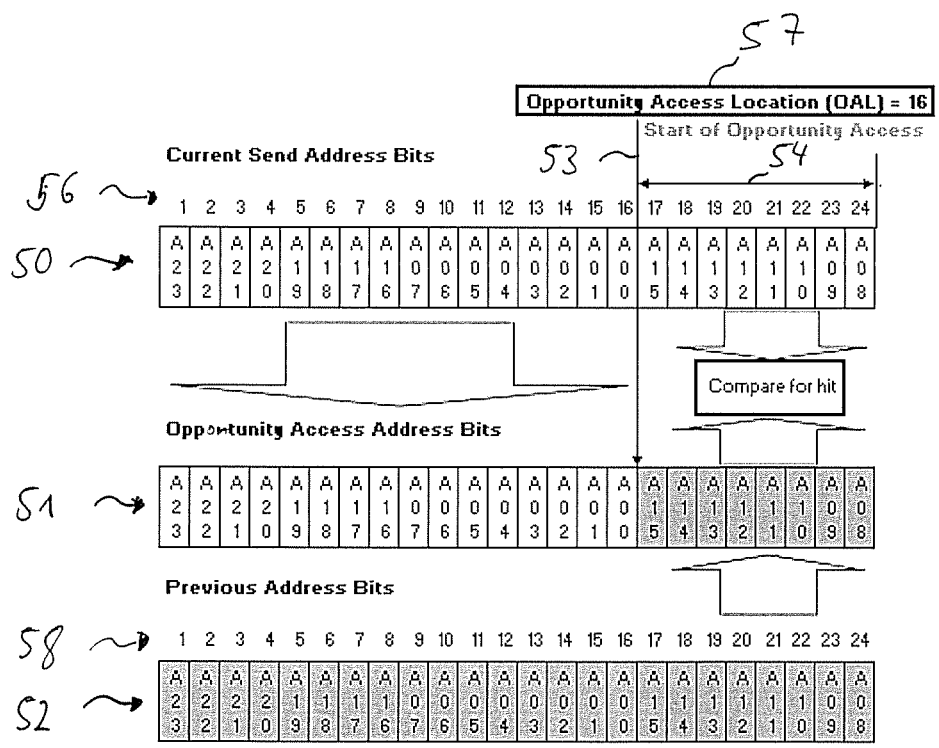

In FIG. 5, the reference numerals basically correspond to the reference numerals of FIG. 4 plus 10, i.e. the currently sent address is generally labeled 50, the opportunity access address is generally labeled 51, the previous address is generally labeled 52, the start of opportunity access is generally labeled 53, the time saving of the opportunity access is generally labeled 54, the opportunity access location is generally labeled 57, the order of the currently sent address is generally labeled 56 and the order of the previous address is generally labeled 58.

In the embodiment of FIG. 5, it is assumed that for example the memory is arranged in banks of 64 kilobytes with a full 16 megabyte address range (where for example the bank is given by the 8 most significant bits A23-A16). In situations where the bank changes often A23-A16 may be sent first followed by A07-A00. After having received these bits, the opportunity access starts as depicted in FIG. 5. After this, the more significant bits of the address within the bank A15-A08 may follow.

As can be seen from the above discussions of variations and alternatives, the scope of the present invention is not to be construed as being limited by the above described embodiments.

What is claimed is:

1. A memory device, comprising:
    a memory controller, said memory controller comprising an input to receive an address for a memory access, and
    a memory coupled to said memory controller,
    said memory controller being adapted to receive solely a first part of an address, the address having the first part and a second, different part and to perform a memory access based on said first part of said address and a second part of a previously received address for a previous memory access.

2. The memory device of claim 1, wherein said first part of said address and said second part of said previously received address form an estimated address, and wherein the memory controller is further configured to receive the second part of said address, said first part and the second part together forming the complete address, to check whether said complete address corresponds to said estimated address, to return the result of said memory access if said complete address corresponds to said estimated address and to perform a further memory access based on said complete address in case said complete address does not correspond to said estimated address.

3. The memory device of claim 1, wherein said memory comprises a flash memory.

4. The memory device of claim 1, wherein said input is a serial input.

5. The memory device of claim 1, wherein said address comprises a plurality of bits, wherein the memory controller is adapted to receive the bits in an order which is different from the order of the bits according to their value.

6. The memory device of claim 1, further comprising a register, a value storable in said register indicating a size of said first part.

7. A memory interface, comprising:
    an output configured to output data to a memory device,
    an input configured to receive memory access information from a circuit, said memory access information comprising an address,
    wherein said memory interface is configured to transmit a first part of said address to said memory device via said output,
    after transmitting said first part, to transmit a second part of said address to said memory device, said first and second part forming said address, wherein the transmitting of the first address part and the second address part are separate transmissions,
    to determine an estimated address based on said first part of said address and a part of a previously transmitted address from a previous memory access,
    to check if said estimated address corresponds to said address,
    to insert a first number of dummy clock cycles if said estimated address corresponds to said address, and
    to insert a second, different number of dummy cycles if said estimated address does not correspond to said address.

8. The interface of claim 7, wherein said first number of dummy cycles is smaller than said second number of dummy cycles.

9. The interface of claim 8, wherein said first number is zero.

10. The interface of claim 7, wherein said output is a serial output.

11. The interface of claim 7, wherein said interface is configured to interface with a flash memory.

12. An apparatus, comprising:
    electronic circuitry,
    a memory device, and
    a memory interface coupled between said electronic circuitry and said memory device,
    said memory device comprising:
        a memory controller, said memory controller comprising an input coupled to said memory interface to receive an address for a memory access, and
        a memory coupled to said memory controller,
        said memory controller being adapted to receive solely a first part of an address, the address having the first part and a second, different part and to perform a memory access based on said first part of said address and a second part of a previously received address for a previous memory access.

13. The apparatus of claim 12, wherein said first part of said address and said second part of said previously received address form an estimated address, and wherein the memory controller is further configured to receive the second part of said address, said first part and the second part together forming the complete address, to check whether said complete address corresponds to said estimated address, to return the result of said memory access if said complete address corresponds to said estimated address and to perform a further memory access based on said complete address in case said complete address does not correspond to said estimated address.

14. The apparatus of claim 12, wherein said memory comprises a flash memory.

15. The apparatus of claim 12, wherein said input is a serial input.

16. The apparatus of claim 12, wherein said address comprises a plurality of bits, wherein the memory controller is adapted to receive the bits in an order which is different from the order the bit according to their value.

17. The apparatus of claim 12, wherein the memory device further comprises a register, a value storable in said register indicating a size of said first part.

18. The apparatus of claim 12, wherein said memory interface comprises:
    an output coupled to said input of said memory device,
    an input configured to receive memory access information from said electronic circuitry, said memory access information comprising an address,
    wherein said memory interface is configured to transmit said first part of said address to said memory device via said output,
    after transmitting said first part, to transmit a second part of said address to said memory device, said first and second part forming said address, to determine an estimated address based on said first part of said address and said part of a previously transmitted address from a previous memory access,
to check if said estimated address corresponds to said address,
to insert a first number of dummy clock cycles if said estimated address corresponds to said address, and
to insert a second number of dummy cycles if said estimated address does not correspond to said address.

19. A method, comprising:
receiving solely a first part of an address, the address having the first part and a second, different part,
determining an estimated address based on said first part and a second part of a previously received address, and
performing a memory access based on said estimated address.

20. The method of claim 19, further comprising:
receiving the second part of said address, said first part and said second part forming the complete address,
checking if said complete address matches said estimated address, and
outputting a result of said memory access if said estimated address matches said complete address.

21. The method of claim 20, further comprising:
performing a further memory access based on said complete address if said complete address does not match said estimated address.

22. The method of claim 19, wherein said address comprises a plurality of bits, wherein said second portion comprises bits having a higher value than at least some of the bits of said first portion.

23. A method, comprising:
transmitting a first part of an address for a memory access to a memory device,
after transmitting said first part, transmitting a second part of said address to said memory device, wherein the transmitting of the first address part and the second address part are separate transmissions,
determining an estimated address based on said first part and a second part of a previously transmitted address,
checking if said estimated address corresponds to said address,
inserting a first number of dummy clock cycles if said estimated address corresponds to said address, and
inserting a second, different number of dummy clock cycles if said estimated address does not correspond to said address.

24. The method of claim 23, wherein said first number is smaller than said second number.

25. The method of claim 24, wherein said first number is zero.

* * * * *